8522½X
Armstrong & King
Grain Winnower.
Patented Dec. 2, 1834.
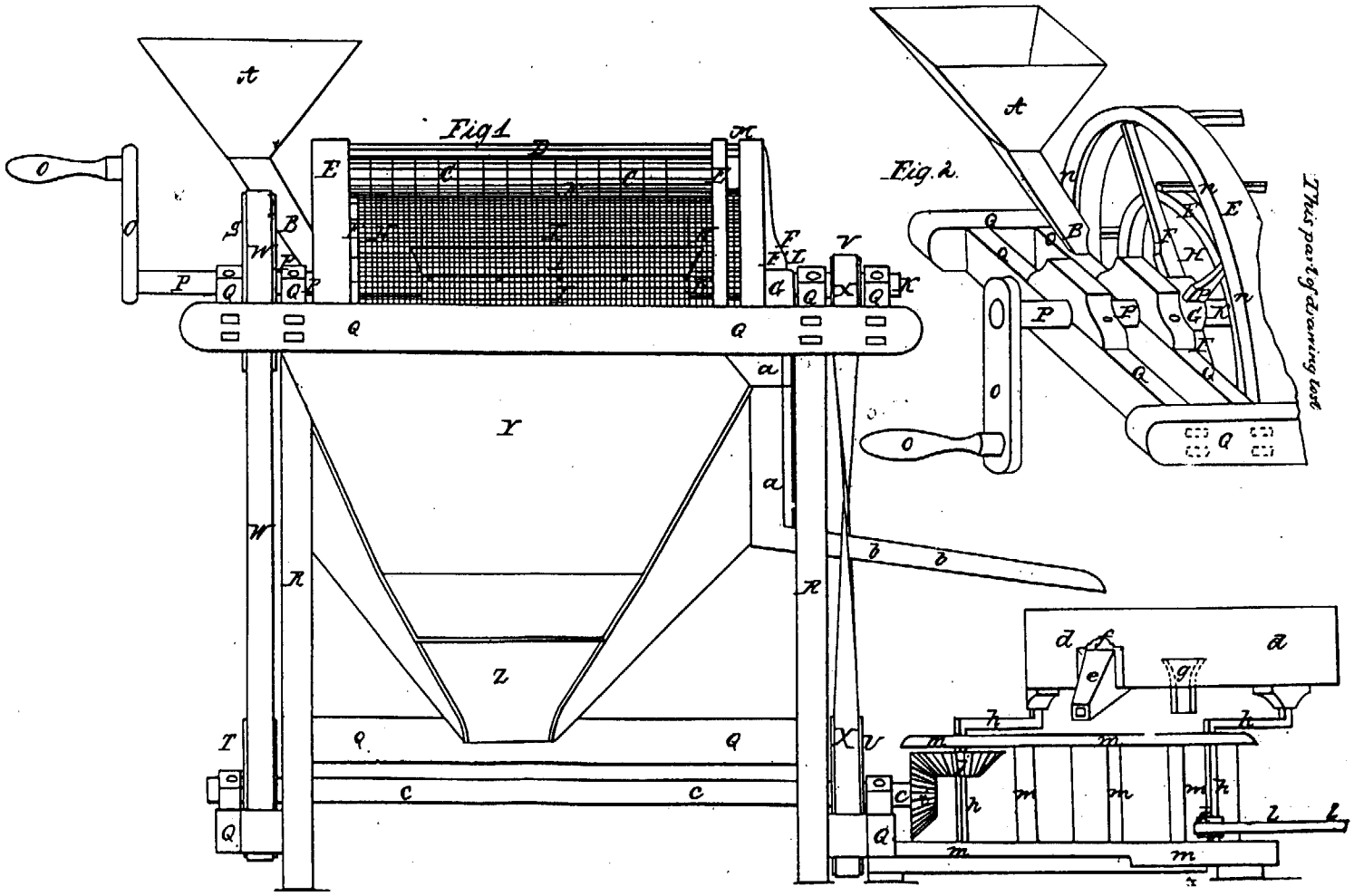

12/2/1834 8522½X [illegible]

Dec. 2. 1834 235

Martin N. Armstrong & William H. King
Letters Patent

The Schedule referred to in these Letters Patent and making part of the same containing a description in the words of the said Martin N. Armstrong & William H. King themselves of their improvement in machinery for sifting cleaning and screening grain and berries of all kinds. To all to whom these presents shall come — Be it known that we Martin N. Armstrong & William H. King both of the City and County of New York and State of New York have jointly invented a new and useful improvement in machinery for sifting, cleaning and screening grain & berries of all kinds & descriptions whatsoever, be the same whole or ground and that the following is a full and exact description of the construction and operation of the said machinery as invented and improved by us the said Martin N. Armstrong & William H. King. The Invention and Improvement aforesaid for the purposes aforesaid is two fold to wit. In the first place the said invention & improvement embraces and consists of a cylindric sifter formed & constructed in the manner following. that is to say. a cylinder is formed covered & bounded on its circular surface or boundary by wire or other net work or net ting of such strength construction and proportions as may be required by the particular kind or description of grain or berries to be sifted, cleaned, or screened. This cylinder is divided into two apartments by similar net work of like strength, construction and proportions placed & being in a cylindric form, within and parallel to the said outer covering or boundary. and forming a smaller cylindric apartment within the larger or outer apartment. The said net work is in both instances secured guarded & strength ened by bars of wood or metals placed & being lengthways with the said cylinder and at both ends thereof affixed and secured to rims or facias of wood or metal which protect the end edg-es Drawing (See [illegible])

12/2/1834 0522½ X ers of the said net work respectively & to which bars the said net
work is secured. One extremity, or end of the said outer apart
ment of the said cylinder is closed and bounded by a circular
end plate of wood or metal of the same diameter of the said
cylinder thereunto affixed and secured: from the middle of which
said end plate a circular piece is cut out of sufficient size or di
mensions, to leave entirely open the end or extremity of the said inner
apartment of the said cylinder. the said end plate is strength
ened guarded and secured by two arms of wood or metal crossing
each other at right angles at the centre of the said end plate
where they are secured in a journal or bearing of wood or metal
and which arms run and extend at both ends thereof respect
ively to the circumference of the said end plate. Between
the said end plate and the said rim or felly which protects
the said end edge of the said outer net work as aforesaid
a narrow open space is left all round the said cylinder
except where the said bars cross from the said last named rim
or felly to the said end plate. The other extremity or end of
the said cylinder is open except so much thereof as is covered by
a narrow projecting rim of wood or metal which is affixed
and secured to the said rim or felly which protects that end
edge of the said outer net work as aforesaid. The said project
ing rim projects inwards from the said outer boundary of the
said cylinder and is sufficiently wide to prevent any grain or
seeds from passing or falling from the said outer apartment of the
said cylinder at that end thereof. At a short distance within the
said projecting rim two arms of wood or metal are placed
which arms cross each other at right angles at the centre of
a circle whose circumference is on the circular surface of the
said cylinder and are there secured in a journal or bearing
of wood or metal and which arms at both ends thereof
respectively run and extend and are secured to the said
rim or felly which is at that end of the said cylinder, pro jects the end edge, of the said, outer network as aforesaid. The said
inner apartment of the said cylinder is occupied by a fan com-
posed of a shaft to which are affixed and secured at alternate
right angles to each other four thin plates of wood or metal of
such length and depth as will permit them to revolve with and
upon the said shaft freely and with as much effect as may
be within the said inner apartment of the said cylinder —
The said cylinder is attached to, and supported by an oblong
frame of wood or metal consisting of four legs, sufficiently secured
together by single cross ~~[illegible]~~ bars on each of the sides thereof and
by double or parallel cross bars on each side of the ends thereof
respectively, with this frame the said cylinder is joined connec-
ted & attached on the said open end of the said cylinder
by a short solid round shaft of wood or metal which passes
through and revolves freely within a sufficient bearing and
journal in an inner cross bar on one end of the said frame
and is firmly secured to the said journal or bearing of the said
arms within that end of the said cylinder aforesaid: and on
the other or close end of the said cylinder by a short round shaft
which is firmly affixed and secured to the said journal or bear-
ing of the said arms of that end of the said cylinder and
which shaft passes through and freely revolves within a
sufficient journal in an inner cross bar of that end of the
said frame. Through the middle of the last named shaft
is a round hole or bore of sufficient diameter to allow the
said shaft of the said fan to work or revolve freely with-
in it — Affixed and secured to the said frame as close as
convenient above the said open end of the said cylinder is a
sufficient hopper made of wood or metal to the bottom of which
hopper is affixed & secured a leader or conductor of wood or
metal which conducts and leads from the opening in the
bottom of the said hopper and inclines gradually towards
the said ~~the said~~ open end of the said cylinder. The

12/2/1834 8522 1/2X

The lower end of the said conductor or leader rests in the space between the aforesaid projecting rim (which prevents grain or berries from passing off at that end as aforesaid) and the said arms which are affixed to the said cylinder at a short distance within the said projecting rim as aforesaid so that the said cylinder can revolve freely without being interrupted stopped or touched by the said leader or conductor, and so also that grain or berries falling from the said conductor or leader fall upon & against the lower part of the inner surface of the said outer net-work & within the said projecting rim. The said legs of the said frame at that end thereof where is the said open end of the said cylinder are as much longer than the said other legs thereof as is sufficient to incline the said cylinder from the said open end thereof to the said close end thereof in such a degree as will cause grain or berries when in the said outer apartment of the said cylinder to descend gradually with the motion of the said cylinder from the said open to the said close end of the said outer apartment thereof. A receiver is affixed and secured to the said frame under the said cylinder which receiver gradually inclines towards and terminates in a conductor or mouth or other opening.

Directly under the said narrow open space left as aforesaid round the said cylinder at the said close end thereof, is affixed and secured another smaller receiver wholly separate from the said first-mentioned receiver and descending and inclining to a point where it terminates in a leader or conductor which inclines towards and beyond that end of the said frame. Below the said two receivers and perpendicularly under and parallel to the aforementioned short shafts of the said cylinder a shaft called the lower shaft passes through and revolves freely within journals and bearings in the lower cross bars of

12/2/1834 8522?2X of the said ends of the said frame, and to which lower shaft between the bearings thereof at each end of the said frame respectively) are affixed and secured two round pulleys of wood or metal of unequal diameters the smaller thereof being at that end of the said frame where is the said open end of the said cylinder and the larger thereof at that end of the said frame where is the said close end of the said cylinder. The proportion between the diameters of these lower pullies must be regulated by the increased velocity which it is desired to impart to the said fan. The said cylinder is worked or set in motion by a crank (or other power which may be applied) attached to the said short solid shaft of the said cylinder or such power may be applied to the said other short shaft of the said cylinder or to the said lower shaft.

To the said short solid shaft of the said cylinder between the bearings thereof in the said double or parallel crofs bars a round pulley of wood or metal is affixed and secured directly over the said smaller pulley of the said lower shaft and is as much larger in diameter than the last named pulley as the increased velocity desired to be given to the said fan may require. The said upper pulley is connected with and acts upon the said smaller pulley of the said lower shaft by means of a connecting strap which when the crank (or other power aforesaid) turns the said upper pulley acts upon & turns the said lower pulley in the same direction and with as much greater velocity as the difference between the diameters of the said pullies will cause. On the other end of the said lower shaft the said larger pulley thereto affixed necessarily revolves with the same velocity as the said smaller pulley last described and by means of a connecting strap is connected with and acts upon a smaller pulley affixed and secured to the said shaft of the said fan (similarly)

directly above the said larger pulley of the said lower shaft, the difference in diameter between the said two last named pullies must also be regulated by the increased velocity which it is desired to impart to the said fans —

The said shaft of the said fan is set in motion by and revolves with the said pully thereunto affixed as abovementioned and passes out through and revolves within the aforementioned box in the said short shaft of the said cylinder at that end thereof having its own journal and bearing on an outer cross bar at that end of the said frame and at its opposite extremity rests upon and revolves freely within a bearing in the inner end of the said short solid shaft, which there supports the said cylinder and connects it with the said frame as aforesaid. The said connecting strap last aforementioned is crossed between the said pullies which it connects as aforesaid so that thereby the motion given to the said fan is opposite to the motion given to the said cylinder as aforesaid, the revolutions of the said fan being directly reverse to those of the said cylinder. The said fan moves with as much greater velocity than the said cylinder as the respective differences between the diameters of the said pullies will cause as aforesaid. The motions aforesaid may also be obtained by connecting rods or cog-wheels used in the place & stead of the aforesaid pullies and connecting straps or by connecting the said cylinder with a pulley on the said lower shaft by means of a connecting strap or connecting rod. Grain or berries being placed in the said hopper pass thro' the said leader or conductor thus so affixed, and fall as aforesaid against and upon the said inner surface of the said outer net-work of the said outer apartment of the said cylinder. They are prevented from falling from or passing out of the said open end of the said outer apartment by the aforementioned projecting rim. The said
cylinder cylinder being put in rapid motion in manner aforesaid the said
grain or berries are necessarily kept in rapid and continued motion
against and upon the said fan inner surface of the said outer net-
work of the said cylinder and the said fan at the same time revolv-
ing in the opposite direction with much greater velocity forces and
throws a strong current of air against the said grain or berries
and continually in a manner opposes and resists the motion given
to them by the said cylinder. By these means the said grain
or berries are speedily sifted, cleaned and screened off & from all
impurities sufficiently small to pass through the openings in the
said outer net work whence the said impurities fall into the
said larger receiver & pass off and are discharged at the said
mouth or outer opening thereof and the said grain or berries
gradually passing down the inclined inner surface of the
said outer net work to the close end of the said outer apart-
ment, fall through the aforementioned narrow open space
there left round the said cylinder as aforesaid into the said
smaller receiver below and under the same as aforesaid
whence they pass off by & through the said leader or conductor
thence leading or conducting as aforesaid. When such
grain & berries so to be sifted cleaned and screened are heated the
aforementioned rapid motion of the said cylinder and the said
current of air so thrown against the said grain and berries as
aforesaid speedily cool the same, and when such grain and berries
are ground & have become caked or hardened by wet or otherwise the
said motion and air speedily break such cakes & reduce such
hardness and restore such grain and berries to their proper state
as ground grain & berries. A moveable case or covering may
be placed over the said cylinder for the purpose of preserving and se-
curing the same from dust dirt or accidents. And we the
said Martin N. Armstrong & William W. Ewing say and
claim that we are the joint and original inventors of the
cylinder herein before mentioned & described for the purposes
herein herein before mentioned and described and of the application & use as herein before stated and set forth of all the machinery herein before mentioned and described for the purposes aforesaid —

In the second place the said invention & improvement embraces & consists of a separator made of wood or metal and which is of the usual form of a sieve, except that the bottom thereof may be either solid or perforated like that of a sieve or have the outer part thereof perforated like a sieve and the inner or middle part thereof solid and except also the openings or passages thereupon herein after particularly mentioned and described. In the projecting rim of the said separator and on a level with the bottom thereof or in the bottom plate of the said separator and close to the said projecting rim thereof are one or more openings continued by leaders or conductors on the outside of the said separator into which leaders or conductors fit small slides which close or lessen the passages there through respectively at pleasure. The number of the said last named openings must be regulated by the size and capacity of the separator used. There is also another opening in the middle of the said bottom plate, which opening is circular, the centre thereof being the centre of the said bottom plate. to the last named opening both above and below fits loosely a thin plate of wood or metal of greater diameter than the said opening and each of which plates has a smaller opening or passage in the middle thereof respectively also circular: these last named openings or passages are connected together by a hollowed or bored piece or pipe of wood or metal passing through the said opening in the middle of the said bottom plate and secured to the said openings in the said thin plates so that one thereof fits loosely but closely above or on and the other thereof fits loosely but closely below or under the said bottom plate of the said separator: and so as to cover the said opening in the said bottom plate last aforesaid: except except so much thereof as is equal to and occupied by the passage
in the said hollowed or bored piece or pipe. The said hollowed
or bored piece or pipe rises above the bottom of the said separator to
a small height more or less. as may be required by the size or
capacity of the separator to which it is attached and of which
it forms a part and is of the shape and form of a common fun-
nel the inverted conical part or mouth thereof being above and
the pipe thereof being as aforesaid below the level of the bottom of
the said separator The said separator rests or stands
so as to be removed at pleasure upon three equal cranks placed
and being in a frame of wood or metal and at the respective cor-
ners of an equilateral triangle these last named cranks stand
or rest in steps or bearings in the lower part or platform of the
said frame last named. wherein the lower ends thereof work
or revolve freely. The shafts of the said three cranks work
or revolve freely in sufficient journals in the said frame and
the pins thereof work freely in equidistant journals in the
said bottom plate of the said separator. the said three cranks
may be constructed so that their sweep may be lengthened or re-
duced by means of a slot-way and moveable pin in each
of the arms thereof respectively. the sweep of the said three cranks
must be so regulated that the extremity of the aforementioned
leader or conductor from the said smaller receiver below
and under the narrow open space round the said cylinder
as aforesaid shall always during the motion of the said separa-
tor herein after described over some point of or on the said bot-
tom plate of the said separator between the said project-
ing rim thereof and the said moveable centre piece thereof
herein before mentioned and described. The said frame of the
said separator is affixed and secured to the said frame of
the said cylinder at the close end thereof under the said in-
clined leader or conductor which projects from the said smal-
ler receiver beyond that end of the said cylinder and frame
as

12/2/1834 8522½X as aforesaid. On the supporting crank of the said separator and to the shaft thereof is affixed and secured a mitred cog wheel corresponding to and joining and connected and locked with another mitred cog wheel affixed and secured to that end of the said lower shaft without and beyond the bearings thereof. Thus when the said lower shaft is in motion as aforesaid, the last named cog wheel thereunto attached sets in motion the corresponding cog wheel on the said supporting crank of the said separator as aforesaid; and the said last named crank thus set in revolution propels and forces the said separator so that a point at the centre of the said bottom plate thereof performs a circle round a point equidistant from the said corners of the said equilateral triangle with a radius equal to each of the arms of the said supporting cranks; and when the said separator is put in motion as aforesaid the said moveable centre piece thereof aforesaid is continually thrown towards that point on the edge of the said bottom plate of the said separator farthest from the said point, equidistant as aforesaid from the said corners of the said equilateral triangle. — -

When grain or berries pass from the said inclined conductor or leader conducting or leading from the said smaller receiver as aforesaid, they fall upon the bottom plate of the said separator between the said projecting rim thereof and the said moveable centre piece thereof. By the laws of centrifugal motion and of gravity, grain or berries being of greater specific gravity than impurities mixed with them are thrown by the aforesaid motion of the said separator towards or against the said projecting rim thereof, whence they gradually pass off and are discharged through a passage or passages and leader or conductor or leaders or conductors in or close to the said projecting rim as aforesaid. Impurities mixed with grain or berries being of less specific gravity than the said grain or berries as aforesaid gradually gradually accumulate around the said moveable centre piece pass over and into the mouth thereof aforesaid and fall and are discharged through the said moveable centre piece as aforesaid.

Whatever tendency (if any) grain or berries might have on first falling on the said separator to pass to or into the said passage of the said moveable centre piece is sufficiently resisted by the raised side of the said funnel or centre piece until such grain or berries are thrown as aforesaid towards or against) the said projecting rim of the said separator.

When grain or berries happen to be of less specific gravity than impurities mixed with them the operation of the said separator is necessarily reverse to the operation thereof herein before described: the said grain or berries gradually passing off through the said centre piece and the said impurities through the said passage or passages in or close to the said projecting rim as aforesaid. and when grain or berries happen to be of less specific gravity than certain impurities mixed with them and of greater specific gravity than certain other impurities also mixed with them, then the said impurities are separated from said grain or berries. by passing the said grain and berries twice through the said separator as aforesaid by the means aforesaid. As particles of matter in or on the said separator near the said funnel or centre piece are kept by the aforesaid motion of the said separator in continual motion around the centre of the said bottom plate of the said separator, the said funnel or centre piece is constructed and placed as aforesaid so as to receive or take a similar or corresponding motion as aforesaid; and thus the said motion of the said particles is not broken, interrupted or disturbed by the said funnel or centre piece. But the said funnel or centre piece may also be constructed and placed stationary and fixed at the centre of the said bottom plate of the said separator and will thus also answer the the purposes aforesaid. ... If the said bottom plate or part there
of) is perforated or made of net or sieve work as aforesaid any
small dirt or impurity which may not pass away otherwise
as aforesaid, will escape and be discharged through such net
or wire work or perforations. Thus dirt or other impurities
which pass or escape with grain or berries from the said cylinder
is separated therefrom by the aforesaid operation of the said
separator. The aforesaid motion of the said separator may also
be obtained by means of a connecting strap connecting a round
pulley affixed and secured to one of the said three supporting
cranks of the said separator and a pulley affixed and secur-
ed to the lower or other shafts aforesaid or by means of a con-
necting rod one extremity of which should be affixed to
the said separator, and the other extremity to a crank or pulley
affixed and secured to one of the shafts aforesaid; whereby
the last named extremity of the said connecting rod would
be carried round by the said crank or pulley describing
a circle or an imaginary perpendicular plane, and the oth-
er extremity thereof would describe a circle or an imagin-
ary horizontal plane, carrying with it the said separator
When desirable, two, three or more separators may be used
in the manner following, to wit, to the shafts of two of the
said supporting cranks (to which is not attached the said
mitred or other pulley for the purposes aforesaid) round pulleys
may be affixed and secured, connected by connecting straps
with similar pullies similarly affixed and secured to a
supporting cranks of each of two similar separators respect-
ively, and these additional separators may in like man-
ner be connected with other similar separators. In this last
named case of having more than one separator as aforesaid
the said leader or conductor, leading or conducting as aforesaid
from the said smaller receiver should branch off in as
many separate branches as separators used. and such bran
ches ches should conduct grain or berries equally to such separator in like manner as is herein before mentioned. set forth and described; the said separator may be covered by a moveable plate or cover with a sufficient passage for grain and berries.

And we the said Martin N. Armstrong & William H. King, do say and claim that we are the joint and original inventors of the said centre piece of the said separator as is herein before particularly described for the purposes aforesaid and of the application and use as is herein before stated and set forth of the machinery herein before in the second place mentioned and described for the purposes aforesaid. The said cylindric sifter and the said separator may also be respectively used in the manner aforesaid for the purposes aforesaid separately and apart. And we the said Martin N. Armstrong & William H. King have hereunto annexed two views or drawings of the machinery invention & improvement herein before mentioned and described, as and for a part and parcel of this our specification thereof; one of the views or drawings marked N° 1. (number one) being a front or full view of the side of the said cylinder, separator and other machinery; and the other of the said views or drawings marked N° 2. (number two) being an oblique view or drawing of the open end or extremity of the said cylinder. And we the said Martin N. Armstrong & William H. King have thereunto respectively and to the several parts thereof respectively annexed certain letters as and for letters or marks of reference to represent or indicate the several and respective parts of the said views or drawings to which they are so annexed in the following explanation or description of the said views or drawings to wit; A. represents or indicates the hopper aforesaid. B. represents or indicates the leader or conductor thence leading or conducting as aforesaid C. represents or indicates the wire wire or other net work or boundary aforesaid of the said outer
apartment of the cylinder aforesaid D. represents or indicates
the aforesaid bars to which the last named net work is
secured as aforesaid. E. represents or indicates the wires or
fellies which protect the end edges of the net work within
described respectively as aforesaid. F. represents or indicates
the arms aforesaid crossing each other at right angles at or
near the respective ends of the said cylinder as aforesaid.
G. represents or indicates the journals or bearings in which
the said arms are secured as aforesaid. H. represents or
indicates the wire or other net work or boundary of the
aforesaid inner apartment of the said cylinder I. repre
sents or indicates the fan aforesaid. K. represents or indi
cates the aforesaid shaft of the said fan. L. represents or
indicates the aforesaid short shaft of the said cylinder
placed and being at the close end thereof as herein before
described M. represents or indicates the aforesaid narrow
open space left all round the said cylinder at the close
end thereof as herein before described N. represents or indi-
cates the aforesaid bars to which is secured the said network
of the said inner apartment of the said cylinder as aforesaid.
O. represents or indicates the aforesaid crank attached to
the said short solid shaft of the said cylinder as aforesaid
P. represents or indicates the aforesaid short solid shaft
of the said cylinder placed and being at the open end there
of as herein before described. Q. represents or indicates the afore
said cross bars of the frame aforesaid to which the said cylinder
is attached as aforesaid. R. represents or indicates the afore
said legs of the said frame. S. represents or indicates the afore
said pulley affixed and secured to the said short solid shaft,
of the said cylinder between the bearings thereof as herein before des
cribed. T. represents or indicates the aforesaid smaller pulle
of the said lower shafts. U. represents or indicates the aforesaid
larger larger pulley of the said lower shaft. V. represents or indicates the aforesaid pulley affixed and secured to the said shaft of the said fan as aforesaid W. represents or indicates the aforesaid connecting strap which connects the said pulley of the said short-solid shaft with the said smaller pulley of the said lower shaft - as aforesaid. X. represents or indicates the aforesaid connecting strap which connects the said larger pulley of the said lower shaft with the said pulley affixed and secured to the said shaft of the said fan as aforesaid. Y. represents or indicates the aforesaid larger receiver placed and being under the said cylinder as aforesaid Z. represents or indicates the aforesaid mouth or other opening thereof. a. represents or indicates the aforesaid smaller receiver placed and being under the said narrow open space at the close end of the said cylinder as aforesaid. b. represents or indicates the aforesaid leader or conductor thence leading or conducting as aforesaid, c. represents or indicates the aforesaid lower shaft. d. represents or indicates the aforesaid projecting arm of the said separator, e. represents or indicates one of the aforesaid leaders or conductors leading or conducting from one of the aforesaid openings or passages in or close to the said projecting arm as aforesaid f. represents or indicates the small slide which closes or opens the passage of the said leader or conductor as aforesaid g. represents or indicates the aforesaid moveable funnel, centrepiece or passage of the said separator. h. represents or indicates the aforesaid supporting cranks of the said separator. i. represents the aforesaid milled cog-wheel — affixed to the end of the said lower shaft as aforesaid j. represents or indicates the aforesaid corresponding milled cog-wheel affixed to one of the said supporting cranks as aforesaid k. represents or indicates the aforesaid round pulley which may be affixed as aforesaid to one of the said supporting cranks of the said separator for the purpose

250.

purposes aforesaid. L. represents or indicates the connecting strap connecting the last named pully with another pully as aforesaid for the purposes aforesaid. M. represents or indicates the aforesaid frame of the said separator. N. represents or indicates the aforesaid narrow projecting rim projecting inwards around the open end of the said cylinder as aforesaid Witnesses
E. G. Ryan
Elisha Morrill Martin N. Armstrong
Wm H. King Exd. W.H.

[5360 ...

Drawing